W. W. BARNES.
Hay Loader.

2 Sheets—Sheet 2.

No. 52,814.

Patented Feb. 27, 1866.

WITNESSES:
E. N. Drury
Philip S. Dodge

INVENTOR
W. W. Barnes
By H. C. Dodge,
Attorney

UNITED STATES PATENT OFFICE.

W. W. BARNES, OF LYME, NEW HAMPSHIRE.

IMPROVEMENT IN MACHINES FOR RAKING AND LOADING HAY.

Specification forming part of Letters Patent No. 52,814, dated February 27, 1866.

*To all whom it may concern:*

Be it known that I, WILLIAM W. BARNES, of the town of Lyme, in the county of Grafton and State of New Hampshire, have invented certain new and useful Improvements in Machines for Raking and Loading Hay; and I hereby declare that the following is a full, clear, and exact description thereof, reference being had to the accompanying drawings, making part of this specification, in which—

Figure 1:
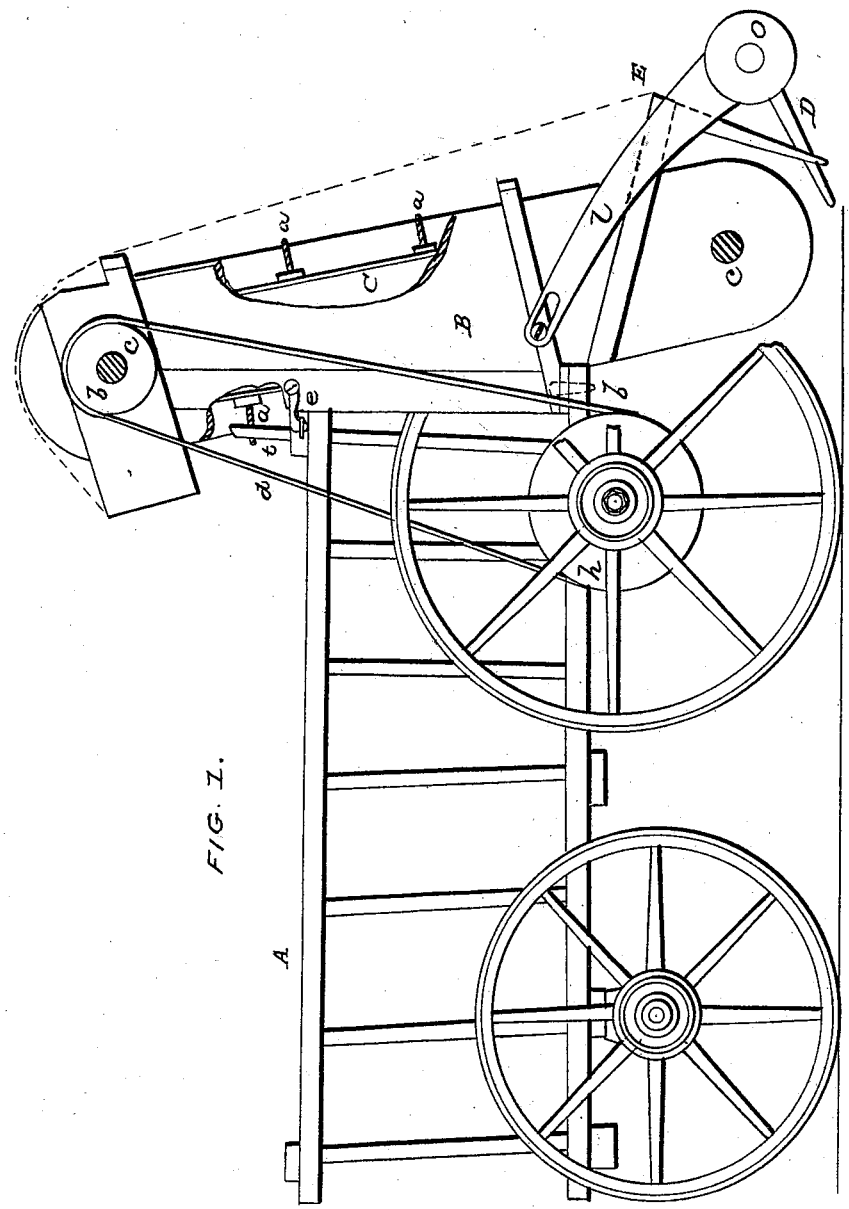
Figure 2:
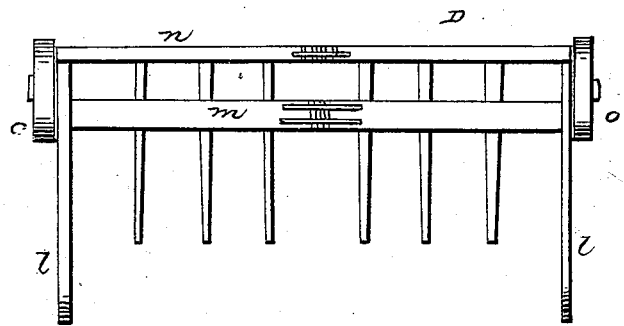

Figure 1 is a side elevation of a wagon with the apparatus attached ready for operation, and Fig. 2 is a view of the rake detached.

Similar letters indicate similar parts in the separate figures.

The nature of my invention consists in mounting upon the rear end of an ordinary farm-wagon a frame containing an endless belt, with a rake of peculiar construction hinged thereto, to gather up the hay and elevate the same and deposit it in the wagon.

To enable others skilled in the art to construct and use my invention, I will proceed to describe it.

A represents a rack for holding the hay, mounted on a wagon. To the rear end of this rack is attached a frame, B, having a shaft or roller secured at each end, as shown in Fig. 1. Around these rollers $c$ and $c'$ is stretched an endless belt, C, to which are secured at intervals transverse rows of teeth $a$.

A stationary rake, E, is secured to the rear side of frame B, near its lower end, as shown in Fig. 1, while a movable rake, D, is pivoted by its arms $l$ to the frame B in such a position as to cause its teeth to project at their front end forward of the teeth of rake E and come in contact with or near to the surface of the earth, for the purpose of gathering up the hay as it is drawn along. In order to enable this rake D to adjust itself to the inequalities of the surface over which it passes, I construct it in two parts, hinged together at the center by metal strips inserted in the bars $n$ and $m$, as shown in Fig. 2.

At each end the rake D is provided with a wheel, $o$, on which its rear portion is supported when brought in contact with the surface of the earth.

By means of the hinge at its center the rake D is permitted to yield so as readily to pass over knolls and through hollows, and at all times keep its teeth close to the surface, and thereby insure raking clean at once passing over the ground.

It is obvious that two or more joints may be made in the rake D, in which case at least one additional wheel should be provided and located between the two wheels at the ends of the head, in order to support the jointed portions.

A pulley, $h$, is secured to the hub of one or both of the hind wheels of the wagon, which is connected by a belt, $d$, to a pulley, $b$, on the shaft $c'$, by which means motion is imparted to the endless belt C.

The lower portion of the rack A projects slightly at its rear end, and on this projecting part the frame B rests, and is secured by pins or bolts $i$, as shown clearly in Fig. 1, it being secured to the upper portion of the rack by the hooks $e$.

The stakes $t$ at the rear end of the rack project above the frame-work or top rail of the rack, as shown, for the purpose of insuring the delivery of the hay from the pins or teeth $a$ of the endless belt C, the frame B having its top inclined forward, so as to cause the teeth $a$ to pass between the stakes $t$ as the former move downward.

The operation is as follows: The apparatus being mounted as shown, the wagon is drawn along over the hay to be gathered, when the latter, being raised by the teeth of rake D, is forced back against the teeth of rake E, by which it is held up against the belt C, the teeth of which seize and force it upward between the side boards of frame B and carry it over the upper shaft, $c'$, from whence it falls into the wagon-rack. If any of the hay remains attached to the teeth, it is forced off from them by being caught on the projecting ends of the stakes $t$, from whence it falls into the rack A.

To prevent the hay from being blown off the carrier-belt C by the wind a canvas cover may be attached, as shown in red line in Fig. 1.

When not in use the apparatus may be removed from the wagon by simply unhooking the hooks $e$ and raising it up so as to release the pins $i$, when it may be left standing in the field while the wagon with its load is taken to the barn or stack to be unloaded.

By the use of this simple apparatus the entire labor of raking and loading of the hay may be accomplished in a very cheap and expeditious manner, thus effecting great saving in time and labor.

Having thus fully described my invention, what I claim is—

1. The apparatus consisting of the frame B, provided with the belt C, the stationary rake E, and pivoted rake D, when secured to the rack A in the manner shown and described.

2. The combination of elevator, the stationary rake E, and the adjustable hinged rake D, as and for the purpose set forth.

W. W. BARNES.

Witnesses:
MARY E. HALL,
EDMUND F. SAWYER.